United States Patent Office 3,099,640
Patented July 30, 1963

---

3,099,640
PROCESS FOR OXIDIZING HYDROGEN SUBSTITUTED ORGANOSILICON COMPOUNDS
Allan S. Hay, Schenectady, N.Y., assignor to General Electric Company, a corporation of New York
No Drawing. Filed Jan. 11, 1961, Ser. No. 81,925
14 Claims. (Cl. 260—46.5)

This invention is concerned with a process for oxidizing compounds containing hydrogen attached directly to silicon. More particularly, the invention relates to a process for oxidizing a silicon compound containing hydrogen attached directly to silicon which comprises treating the said hydrogen containing compound with oxygen in the presence of a tertiary amine and a cuprous salt capable of existing in the cupric state.

Heretofore in order to form

groupings, for instance, in forming silanol

or siloxane

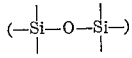

groupings, the usual procedure has been to effect hydrolysis of a silicon-containing compound having attached thereto a hydrolyzable group, for instance, halogen (e.g., chlorine, bromine, etc.); alkoxy radicals (e.g., methoxy, ethoxy, phenoxy, etc., radicals); acetoxy groups, etc. Generally, hydrolysis of certain compositions containing these silicon-bonded hydrolyzable groups results, in many instances, depending on the starting materials, in intermediate products containing silanol groups, i.e., radicals of the form Si—OH, or in conversion to the more fully condensed state resulting from the condensation of the silanol groups, to yield siloxane linkages of the formula

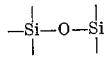

There are many difficulties inherent in making these groupings containing oxygen attached directly to silicon because when one employs monomeric silanes containing as the hydrolyzable group a silicon-bonded halogen, for instance, as in compounds such as methyltrichlorosilane, phenyltrichlorosilane, dimethyldichlorosilane, etc., upon hydrolysis of such silanes with water, a hydrohalide is released, which must be removed from the hydrolysis product in order that it may not adversely affect the hydrolysis product. The use of, for instance, alkoxysilanes for hydrolysis and subsequent condensation purposes will release alkanols which again require removal from the hydrolysis product to insure that there are no remnants of the alkanol present which might interfere with the desired use of such products.

When one attempts to make copolymers of different organosiloxy units, for instance, copolymers composed of dimethylsiloxy and diphenylsiloxy units, or copolymers containing dimethylsiloxy and trimethylsiloxy units (to yield organopolysiloxane fluids such as are more particularly described in U.S. Patents 2,469,888 and 2,469,890), one of the more practical methods is to effect cohydrolysis of the monomeric silanes designed to give the proper organosiloxy units. This again requires the use of monomeric organosilanes containing silicon-bonded hydrolyzable groups which will require removal of undesirable by-products from the reaction product and in some respects requires careful control in order to avoid any harmful effects which a byproduct, such as a hydrogen halide, may have on the final product. It is true that one can obtain copolymers by effecting rearrangement of two polysiloxanes in the presence of a suitable alkaline rearranging catalyst, such as alkali-metal hydroxides, quaternary ammonium hydroxides, etc. However, again the polysiloxanes which are interacted and thereby rearranged are formed from the hydrolysis of monomeric organosilanes containing silicon-bonded hydrolyzable groups, thus again pointing up the problem of avoiding the necessity of dealing with by-products resulting from hydrolysis which may undesirably affect the reaction products obtained.

Adding to the difficulty which has been encountered in the hydrolysis of hydrolyzable organosilanes is that which accompanies the hydrolysis of trifunctional monomeric silanes, for instance monoorganotrihydrolyzable silanes, for example, methyltrichlorosilane, phenyltrichlorosilane, etc. Usually when one effects the hydrolysis of these monomeric materials, the formation of silanols and subsequent condensation of these silanols to the polysiloxane state is so rapid that one obtains gelled, cross-linked products which generally are not amenable to further processing and therefore under normal circumstances find little if any application in the silicone art.

Unexpectedly, I have discovered a new means for forming

groupings by treating a compound containing a silicon-bonded hydrogen under such conditions that one can obtain either silanol groups or siloxane linkages depending upon the conditions of reaction. More particularly, I have discovered that I am able to oxidize silicon-containing compounds in which there is a hydrogen attached directly to a silicon to form either silanol groups or siloxane linkages by contacting the aforesaid silicon-containing compound with oxygen (either oxygen per se, or air, or other oxygen-containing gas) in the presence of a tertiary amine and a cuprous salt capable of existing in the cupric state.

Among the advantages derived from the practice of my invention for effecting oxidation of SiH-containing compounds are (1) better control of the reaction product, (2) the ability to obtain low molecular weight organosilicon compositions and particularly silanol compositions, (3) the ability to use room temperatures or at most low temperatures ranging from about 25 to 50° C., (4) relatively short periods of time to effect the desired oxidation, and (5) the ability to obtain high molecular weight yet soluble products, for instance, soluble in benzene, which can then be converted to the infusible, insoluble state by either heating at elevated temperatures alone or in the presence of a suitable catalyst. The oxidation of organosilicon composition containing hydrogen bonded directly to silicon has been known in the prior art as, for instance, in U.S. Patents 2,507,413 and 2,507,414. However, it will be recognized that in these instances, the temperatures at which oxidation takes place are quite high and range from 150 to 300° C. or even higher. Moreover, there are difficulties in adequately controlling the degree of siloxane formation and unless careful control is exercised, insoluble, infusible products will result. Finally, the times for the usual oxidation conditions disclosed in the prior art are excessively long in contrast to the much shorter periods of time possible to attain the same degree of oxidation by my process.

The term "—Si—H-containing compound" is intended to mean any compound, whether organic or inorganic and whether monomeric, dimeric or polymeric, which contains in its molecular structure hydrogen attached directly to silicon in the form of a silane grouping. Among such compounds may be mentioned those having the general formula (I) $H_xR_ySiX_{4-x-y}$ where $x$ and $y$ are whole numbers equal to from 1 to 3, the sum of $x+y=$ at most 4, X is a hydrolyzable radical selected from the class consisting of halogen (e.g., chlorine, bromine, fluorine, etc.); organoxy radicals (e.g., methoxy, ethoxy, propoxy, phenoxy, etc.); acetoxy radicals; etc.; and R is a member selected from a class consisting of alkyl radicals (e.g., methyl, ethyl, propyl, butyl, isopropyl, amyl, etc., radicals); alkenyl (e.g., vinyl, allyl, methallyl, etc.); aryl radicals (e.g., phenyl, naphthyl, biphenyl, etc., radicals); aralkyl radicals (e.g., benzyl, phenylethyl, etc., radicals); alkaryl radicals (e.g., tolyl, ethylphenyl, etc., radicals); haloaryl (e.g., chlorophenyl, trichlorophenyl, bromonaphthyl, fluorophenyl, $\alpha,\alpha'$-difluorotolyl, etc., radicals); etc. The presence of other inert substituents on the organic radicals, for instance, on the hydrocarbon radicals, is not precluded, as for instance, nitro radicals, other halogens, etc.

Another class of compounds containing the SiH grouping (many examples of which are found in U.S. Patent 2,928,799 issued March 15, 1960) includes compounds having the general formula (II) $R_aH_bSiO_{\frac{4-a-b}{2}}$ where $a$ is a value from 1.0 to 2.25 inclusive, $b$ has a value from 0.05 to 1.25, the sum of $a+b$ being equal to from 1.96 to 2.25 inclusive, and R has the meanings given above. Many of these compounds may be obtained by the hydrolysis of organohydrolyzable silanes containing silicon-bonded hydrogen as, for instance, those described in Formula I, e.g., methyldichlorosilane ($CH_3SiHCl_2$), phenyldichlorosilane, dimethylchlorosilane

[($CH_3)_2SiHCl$]

etc. Instead of hydrolyzing only the monomeric silane containing silicon-bonded hydrogen, one can also effect cohydrolysis of one or more of the monomeric silanes containing silicon-bonded hydrogen with one or more other organohydrolyzable silanes (e.g., dimethyldichlorosilane, trimethylchlorosilane, methyl phenyldichlorosilane, ethyltrichlorosilane, dimethyldiethoxysilane, diphenyldichlorosilane, etc.) or with tetrahydrolyzable silanes (e.g., silicon tetrachloride, tetraethyl silicate, etc.) to form copolymeric organosiloxanes which in addition to containing silicon-bonded organic groups will also contain hydrogen bonded directly to silicon. Such compounds are amply described in the literature and representative of such compositions are those found in U.S. Patents 2,491,843—Wilcock, issued December 20, 1959, and 2,595,890—Sauer, issued May 6, 1952, covering compounds of the general formula (III) 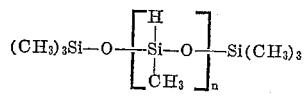

where $n$ is an integer equal to at least 1 and ranging, e.g., from 4 to 500, or more. The substitution of other monovalent hydrocarbons (such as R in Formula I) for one or more of the methyl groups is not precluded. Another class of compounds which may also be employed are those described in U.S. Patent 2,547,678, issued April 3, 1951, having the formula (IV) 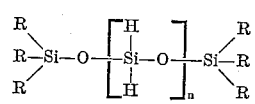

where R has the meaning given above, and $n$ is an integer greater than 1, for instance, from 5 to 500 or more.

A still further class of compounds which can be employed in the practice of the present invention is found in U.S. Patent 2,595,891—Sauer, issued May 6, 1952, in which cyclic compounds of the general formula (V) $(RSiHO)_p$ are described where R may be the same organic radicals as in Formula I, e.g., a lower alkyl radical of from 1 to 5 carbon atoms (e.g., methyl, ethyl, isopropyl, butyl, isobutyl, amyl, etc.), and $p$ is an integer from 4 to 6, inclusive.

A still further class of compounds containing hydrogen bonded directly to silicon is that having the formula (VI) $R_aH_bSiR'_{\frac{4-a-b}{2}}$ where R, $a$ and $b$ have the meanings given above and R' is a divalent organic radical free of aliphatic unsaturation, for instance, alkylene (e.g., ethylene ($-CH_2CH_2-$), propylene $$(-CH_2-\overset{CH_3}{\underset{|}{C}H}-)$$

trimethylene ($-CH_2CH_2CH_2-$), butylene, etc.); arylene [e.g., phenylene ($-C_6H_4-$) including the ortho, para and meta substitutions, tolylene (including all its isomers) naphthylene, xenylene, cyclohexylene, xylene, etc.] as well as other divalent radicals.

Included among the compounds which may be represented by Formula I are, for instance, monomethylsilane, monophenylsilane, diphenylsilane, triethylsilane, methyl phenylsilane ($CH_3SiH_2C_6H_5$), dimethylsilane, methyldichlorosilane, methyldiethoxysilane, phenyldichlorsilane, dimethylethoxysilane, etc.

Included among the polysiloxane compounds coming under Formulas II, III, IV and V may be mentioned, for instance, heptamethyltrisiloxane, heptaethyltrisiloxane, octaisopropyltetrasiloxane, hexaphenyl-2-methyltrisiloxane, 3,5 - dimethyl - 1,1,1,7,7,7 - hexaphenyltetrasiloxane, 1,3,5,7 - tetramethylcyclotetrasiloxane, 1,3,5,7,9,11 - hexamethylcyclohexasiloxane, 1,3,5,7,9-pentamethylcyclopentasiloxane, etc. Other polysiloxane compositions which may be employed in the practice of the present invention may be found in the aforesaid Wilcock and Sauer patents, as well as other patents mentioned; for brevity these patents are incorporated into the disclosures of the instant application by reference.

Specific examples of compounds containing silicon-bonded hydrogen in which there are divalent organic radicals between silicon as embraced by Formula VI may be mentioned, e.g., 1,4-bis(dimethylsilyl)benzene, bis(dimethylsilyl)methane, 2,5,5,8-tetramethyl-2,5,8-trisilanonane having the formula (VII) 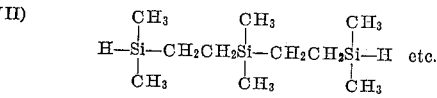

In providing the catalyst comprising the cuprous salt and tertiary amine, the particular cuprous salt used has little if any effect on the type of product obtained. The only requirement is that the cuprous salt must be capable of existing in the cupric state and must be capable of forming a complex with the tertiary amine that is soluble in the reaction medium, which can be, e.g., a suitable solvent, excess amine, or excess of the compound containing the solicon-bonded hydrogen. The necessity for being able to exist in the cupric state is based on the belief that the oxidation reaction is accomplished by an intermediate formation of an activated cupric amine complex that reacts with the Si—H containing compound to regenerate the cuprous amine complex. As far as can be determined, it is impossible to form this activated complex by starting originally with a cupric salt in making the copper amine complex unless reducing conditions are present to form the cuprous salt in situ. Suitable cuprous salts include cuprous chloride, cuprous bromide, cuprous sulfate, cuprous azide, cuprous tetraamine sulfate, cuprous acetate, cuprous propionate, cuprous palmitate, cuprous benzoate, etc. Cuprous salts such as cuprous iodide, cuprous sulfide, cuprous cyanide, cuprous thiocyanate, etc., are not suitable for use in my process because their complexes with the amines are either not soluble in the reaction medium or else are not capable of existing as stable cupric salts.

Examples of tertiary amines which may be used in practicing my invention are the aliphatic tertiary amines, such as trimethylamine, triethylamine, triproplyamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl) bromobenzylamine 1-dimethylamino-2-phenylpropane, 1-dimethylamino-4-pentane, etc. When aliphatic tertiary amines are used, it is preferred that at least two of the aliphatic groups be straight chain hydrocarbon groups.

Examples of cyclic amines are the pyridines, such as pyridine itself, quinuclidine, the dipyridyls, the N-alkyl pyrroles, the N-alkyl pyrrolidines, the N-alkyl piperidines, the N-alkyl diazoles and triazoles, the quinolines, the diazines and triazines, the isoquinolines, the diquinoyls, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc.), alkoxy (for example, methoxy, ethoxy, propoxy, butoxy, phenoxy, etc.), aryl (for example, phenyl, tolyl, dimethylphenyl, chlorophenyl, bromotolyl, naphthyl, chlorobromonaphthyl, etc.), aryloxy (for example, phenoxy, toloxy, xyloxy, chlorophenoxy, naphthoxy, etc.), and the like. Isomers and homologues of these compounds are not precluded. The ring substituents may be the same or different hydrocarbon groups. It is understood that when piperidines, pyrroles, pyrrolidines, diazoles, tetrahydroquinolines, tetrahydroisoquinolines are used they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl piperidine, N-methylimidazole, N-methyl-1,2,4-triazole, N-isopropylpyrrolidine, etc.

By the term "a pyridine" I mean those aromatic organic compounds having a 6-member aromatic ring, 5 of the members being carbon and 1 being nitrogen. Pyridine itself, β-collidine, β- and γ-picoline, 3,4-lutidine, α- and γ-collidine, α-picoline, the 2,4-, 2,5- and 2,6-lutidines, etc., are conveniently available pyridines to use.

In general, tertiary polyamines behave in the same way as tertiary monoamines in my reaction, except of course, the amount used would only have to be that amount necessary to give the equivalent amount of amino groups. Typical examples of aliphatic tertiary polyamines are the N,N,N',N'-tetraalkylethylenediamines, the N,N,N',N'-tetraalkylpropanediamines, the N,N,N',N'-tetraalkylbutanediamines, the N,N,N',N'-tetraalkylpentanediamines, the N,N',N'',N'',N''-pentaalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, and so forth. Preferred are those tertiary polyamines which have only two or three aliphatic or cycloaliphatic carbon atoms separating the two tertiary amino nitrogens. For example, such polyamines give catalysts of enhanced activity and allow the reaction to be run in a shorter time than could be used with the aliphatic tertiary monoamines.

Typical examples of these tertiary polyamines are, for example: N,N,N',N'-tetramethylethylenediamine; N-ethyl-N,N',N'-trimethylethylenediamine; N-methyl-N,N',N'-triethylethylenediamine; N,N,N',N'-tetramethyl-1,3-propanediamine; N,N,N',N'-tetraethylethylenediamine; N,N-dimethyl-N'N'-diethylethylenediamine; 1,2-bis(2-methylpiperidino)-ethane; N,N,N',N'-tetra-n-hexylethylenediamine; N,N,N',N'-tetra-n-amylethylenediamine; 1,2-bispiperidinoethane; N,N,N',N'-tetraisobutylethylenediamine; N,N,N',N'-tetramethyl-1,3-butanediamine; 1,2-bis(2,6-dimethylpiperidino)ethane; N,N-didecyl-N',N'-dimethylethylenediamine; N - methyl,N',N',N'',N''-tetraethyldiethylenetriamine; N-decyl-N,N',N'-triethylethylenediamine; 2-(β-piperidinoethyl)pyridine; 2-(β-dimethylaminoethyl)-6-methylpyridine; 2-(β-dimethylaminoethyl)pyridine; and 2-(β-morpholinoethyl)pyridine, etc.

The effect of an N-aryl group in tertiary amines, e.g., N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer not to use tertiary amines having an N-aryl substituent.

Although I do not want to be bound by my theory, I believe that one mole of cuprous salt forms a complex with two mols of the monoamine or one mol of a diamine. This complex can react with oxygen to form an oxidized intermediate which can form a complex with the SiH-containing compound and cause the reaction to proceed.

Although mixtures of tertiary amines and mixtures of cuprous salts may be used, no particular benefit is believed to accrue from such use. Preferably, the cuprous salt is combined with the tertiary amine and the complex thus formed is dissolved in a suitable solvent before the Si—H containing reactant is added. Excesses of the tertiary amine can be used as the solvent medium over and above that required for complexing purposes. In some cases the dissolving of the cuprous salt may be hastened by heating the mixture, by bubbling in air or oxygen, or a combination thereof. In order to effectively use all of the copper, enough amine should be added to complex and thereby dissolve all of the added cuprous salt. Larger excesses of amine may be desirable in order to completely dissolve all of the SiH-containing reactant and to act as a solvent for the reaction production. However, since it is well known that amines catalyze the condensation of silanols to siloxanes, excesses of amines should be avoided where it is desired to obtain silanols or low molecular weight polysiloxanes. Among the classes of solvents which can be employed in my process may be mentioned, e.g., alcohols, ketones, hydrocarbons, chlorohydrocarbons, nitrohydrocarbons, ethers, esters, amides, mixed etheresters, sulfoxides, etc., providing they do not interfere or enter into the oxidation reaction. Included among such solvents may be mentioned, for instance, ethanol, acetone, anisole, benzene, toluene, trichloroethylene, dichlorobenzene, nitrobenzene, ethyl acetate, dimethyl acetamide, dimethyl sulfoxide, etc. The amount of solvent, if used, can be varied widely, e.g., from 0.1 to 100 parts, by weight, solvent per part Si—H containing compound.

Oxygen or an oxygen-containing gas is bubbled into the reaction mixture causing an exothermic reaction to take place. Ordinarily the reaction is advantageously prefaced by sweeping the reaction mixture with an inert gas, by carrying out the reaction at sub-atmospheric pressure, by the use of open reaction vessels, by heat, or any combination thereof. In carrying out my reaction, the oxygen can be diluted with an inert gas such as nitrogen, helium, argon, etc., or air can be used. By controlling the ratio of oxygen to inert gas the inlet temperature of this mixture, I can conveniently sweep the reaction mixture to cause removal of all of the water as it is formed in the event that silanol (≡SiOH) groups are condensing to polysiloxane linkages.

Since the reaction is usually exothermic, the reaction can become overheated, resulting in the formation of undesirable products. Generally, the oxidation reaction is initiated at as low a temperature as the reaction will start, as evidenced by the reaction becoming exothermic. Usually, I control my oxidation reaction so that the maximum temperature does not exceed 75 to 100° C., and preferably does not exceed 50° C. The heat of reaction may be removed, for example, by radiation, convention, or by cooling coils which can either be immersed in, or surround the reaction vessel.

Ordinarily, I continue the passage of oxygen into the reaction mixture until no more heat is generated, or the desired amount of oxygen is absorbed. To terminate the reaction, the catalyst system can be destroyed by addition of a dilute acid, preferably a dilute mineral acid, such as hydrochloric or sulfuric acid, which reacts with the tertiary amine and cuprous salt; or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product or I may add a chelating agent which deactivates the copper.

In order that those skilled in the art may better understand my invention, the following examples are given by way of illustration and not by way of limitation. All parts are by weight unless stated otherwise.

In general, the oxidations were carried out at room temperature by passing oxygen gas at a rate fast enough to provide an excess over that being absorbed, into a vigorously stirred solution containing the Si-H containing compound and a cuprous salt dissolved in a suitable solvent, which was usually the amine or the amine and a suitable solvent. Oxygen was passed into the reaction mixture until no more heat was evolved. The temperature rose at first and then began to fall upon completion of the reaction. Where the product was either soluble or partially soluble in the reaction mixture, the latter was added to about five times its volume of a non-solvent for the polymer. Where the product was insoluble in the original reaction mixture, it was removed by filtration. Variations from this procedure are designated in the specific examples.

*Example 1*

To a wide-mouthed flask set in a water bath maintained at about 30° C. were added 2 parts cuprous chloride, 2.4 parts N,N,N′,N′-tetramethylethylenediamine and about 265 parts pyridine. While oxygen was passed through the vigorously stirred solution, 15 parts of phenyldimethylsilane was added and the mixture was stirred for 18 hours. At the end of this time, water several times in excess of the volume of the reaction mixture was added, and the reaction mixture was extracted with diethyl ether. The ether layer was washed with dilute aqueous hydrochloric acid (0.1 N) to remove the pyridine, the product dried over anhydrous magnesium sulfate, filtered and fractionally distilled. There was thus obtained a colorless liquid boiling at 66.5° C./1 mm. The oxidized product had a refractive index $n_D^{25}$ 1.5130. This material was identified as phenyldimethylsilanol [$C_6H_5(CH_3)_2SiOH$] by infrared spectrum and by the close agreement with the literature refractive index and boiling point for this compound.

*Example 2*

To a wide-mouthed flask were added 0.5 part cuprous chloride, 1.5 parts N-decyl-N′,N′-triethyl-ethylenediamine and about 119 parts benzene. While oxygen was passed through the vigorously stirred solution, 2 parts monophenylsilane was added. The temperature of the reaction mixture rose to 58° C. in nine minutes and the reaction then subsided. After 20 minutes of further passage of oxygen and stirring of the solution at a temperature of from 45–55° C., the reaction product (in the form of a benzene solution) was washed thoroughly with water containing a small amount of 0.1 N aqueous hydrochloric acid. The solution was evaporated to a small volume under a nitrogen atmosphere and n-hexane was added in an amount equal to about five times the volume of the evaporated liquid. A flocculent precipitate settled out which was filtered and dried in vacuum (0.1 mm.) for 2 hours at 30° C. There was thus obtained a colorless powder that began to soften at 105° C., and on further heating it changed to a viscous liquid which at 250° C. set up to a hard, tough cross-linked solid, which was somewhat brittle at room temperature (27° C.). Analysis of the composition showed it to contain 54.5% carbon and 4.5% hydrogen as contrasted to the theoretical value of 55.9% carbon and 3.9% hydrogen for the polymeric monophenylsiloxane having the recurring unit $C_6H_5SiO_{1.5}$. The infrared spectrum (in carbon disulfide) was superimposable on a spectrum of the hydrolysis product of phenyltrichlorosilane establishing the formation of polysiloxane linkages.

*Example 3*

To a wide-mouthed flask were added 0.5 part cuprous chloride, 0.6 part N,N,N′,N′-tetramethylethylenediamine and about 107 parts acetone. While this solution was vigorously stirred, oxygen was passed through the solution and at the same time 5 parts diphenylsilane was added. In about four minutes the temperature of the reaction mixture rose from about 26° C. to 45° C. After 11 additional minutes of stirring and oxygen passage, the reaction had completely subsided and the temperature began to drop to room temperature. The reaction mixture was then evaporated on a steam bath to about ⅓ of its volume, ice was added, and the product extracted with diethyl ether. The ether layer was washed with water, dried over anhydrous magnesium sulfate and filtered. After the filtered ether solution was evaporated to a small volume, sufficient n-hexane was added to cause deposition from the ether solution of a colorless solid that was found to soften at about 116° C. and melted at 125° C. This material was identified as diphenylsilanediol. When the above reaction was conducted in the presence of excess pyridine as both solvent and ligand in place of the aforesaid tetramethylethylenediamine, the product obtained was a gummy material indicating that the pyridine caused the formed diphenylsilanediol to condense to a polymeric siloxane.

*Example 4*

In this example tetramethyldisiloxane having the formula

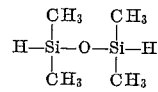

was oxidized similarly as was done in Example 3 employing the same cuprous salt, tertiary amine, and acetone. As a result of carrying out this reaction, there was obtained a benzene-soluble polydimethylsiloxane derived from the condensation of the tetramethyldisiloxanediol having the formula

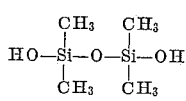

formed from the oxidation of the tetramethyldisiloxane.

*Example 5*

To a wide-mouthed flask was added 1 part cuprous chloride, 1.2 parts N,N,N′,N′-tetramethylethylenediamine, 4 parts of 1,4-bis(dimethylsilyl)benzene having the formula

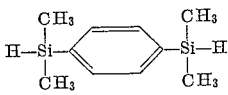

and 107 parts pyridine.

Oxygen was bubbled through the vigorously stirred solution described above for 50 minutes. Water and ice were then added, and the solution was extracted with diethyl ether. The ether layer was washed with dilute hydrochloric acid (0.1 N), dried over anhydrous magnesium sulfate, filtered and evaporated over a steam bath. There was thus obtained a colorless solid having a melting point of 135–137° C. This material was identified as bis(dimethylhydroxysilyl)benzene having the formula

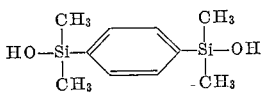

*Example 6*

A solution of 50 parts of phenyldichlorosilane in about 142 parts diethyl ether was washed thoroughly with ice water. The ether layer was dried over anhydrous magnesium sulfate and filtered. Most of the ether was evaporated at room temperature and the residue was added to a wide-mouthed flask containing about 245 parts pyridine and two parts cuprous chloride. While the solution was vigorously stirred, oxygen was passed through. The temperature rose rapidly to 46° C. After 40 minutes of stirring and oxygen passage, the reaction mixture was precipitated by adding methanol in about three times the volume of the reaction mixture. The precipitate was removed by filtration and washed with methanol. This yielded a colorless solid which began to soften at 225° C. Analysis of this material showed that it contained 54.2% carbon and 4.2% hydrogen. This corresponded quite closely to a phenylpolysiloxane having the recurring unit $C_6H_5SiO_{1.5}$, which contains 56.0% carbon and 3.9% hydrogen. If the above oxidation was carried out in benzene as a solvent, and the catalyst was removed by extraction with dilute hydrochloric acid (0.1 N), a solution was obtained which upon evaporation of the volatile material yielded a viscous oil. When this oil was heated, it changed to brittle, insoluble solid indicating a polysiloxane comprising recurring monophenylsiloxane units of the above formula $C_6H_5SiO_{1.5}$; this established that the silicon-bonded hydrogen had been oxidized by the process herein described to give a trifunctional polysiloxane as contrasted to the originally difunctional monomeric phenyldichlorosilane, assuming that the silicon-bonded hydrogen does not at this stage constitute any point of active functionality.

*Example 7*

In this example 40 parts methyldichlorosilane dissolved in about 88 parts benzene was washed thoroughly with ice water in order to effect hydrolysis of the methyldichlorosilane. This gave a polymeric composition in benzene in which the recurring unit was as follows:

The benzene solution was dried over anhydrous magnesium sulfate and filtered. This solution was made up to about 125 parts by the addition of benzene and this benzene solution was then placed in a wide-mouthed flask set in a water bath maintained at 29° C. To this solution were added one part cuprous chloride and 3.4 parts N,N,N′,N′-tetra-n-amylethylenediamine. Oxygen was passed through the vigorously stirred solution and in 15 minutes the temperature of the reaction mixture rose to 39° C. After one hour of oxygen passage and stirring, the reaction mixture was washed with water containing 10 parts of the sodium salt of ethylenediamine tetraacetic acid and about 10.5 parts acetic acid to remove the catalyst, i.e., the copper salt and the amine. The almost colorless benzene solution thus obtained was dried over anhydrous magnesium sulfate and filtered. A film cast from this solution by evaporating the benzene at 70° C. and heating the residue to 100° C. yielded a self-supporting flexible film which was insoluble in organic solvents. Heating at 220° C. did not change any of the characteristics of the film. Even after 10 hours at 250° C. in air, the film had retained its original dimensions, and although a bit more brittle, nevertheless, it would still take a 90° bend. This insolubilization of the originally difunctional polysiloxane established that the oxidation of the hydrolysis product of the methyldichlorosilane had caused the formation of another siloxane

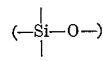

grouping increasing the functionality of the polysiloxane from 2 to 3. With the change to a trifunctional material, cross-linking (to the insoluble state) by heating followed the usual pattern accompanying the heat treatment of a trifunctional polysiloxane.

It should be noted that in the above example, the conversion to a trifunctional product yielded a benzene-soluble product. If hydrolysis had been carried out with methyltrichlorosilane, a gelled, insoluble composition would have been obtained. This difference in results is due to my being able to obtain a more linear, ordered polymer as contrasted to the random type polymer obtained by hydrolysis of methyltrichlorosilane.

It will of course be apparent to those skilled in the art that in addition to the many silicon compounds containing hydrogen attached to silicon described in the foregoing examples, other such compounds may be employed, many examples which have been given previously, without departing from the scope of the invention. Obviously, other tertiary amines and cuprous salts may be employed in place of those used in the foregoing examples. Furthermore, the proportions of the amine and cuprous salt can be varied widely consistent with there being present sufficient amounts of each for complexing purposes (thus requiring the desired molar ratios of each) and any excess of the amine which may be used on the solvent medium. In addition, the conditions under which the oxidation reaction takes place may be varied within wide limits and advantageously within those conditions described previously.

The compositions obtained in accordance with the practice of the present invention have many uses. Silanols obtained by the oxidation of monomeric or even polymeric organosilicon compositions containing silicon-bonded hydrogen can be used as additives for reducing the structure introduced into silicone rubbers due to the incorporation of certain reinforcing fillers such as silica aerogel, fume silica, etc. This structure becomes evident after incorporation of the filler by an increase in "nerve" causing the filled silicone rubber to become springy and rubbery thus preventing the filled silicone rubber from being readily milled to give proper sheeting on rolls of such mills, which is necessary in order to incorporate other important additives, such as, for instance, curing agents.

The organopolysiloxanes of increased functionality formed by the oxidation of organosilicon compositions containing silicon-bonded hydrogen have many uses also. Thus, the organopolysiloxanes can be dissolved in solvents such as benzene, toluene, etc., and used to coat various surfaces to render the latter heat resistant, water repellant, and dirt resistant. Various fillers can be combined with these organopolysiloxanes obtained as results of the oxidation reaction, for instance, finely divided fillers which can be used for making molding compound, various fibrous sheet materials, such as asbestos paper, asbestos cloth, glass cloth, etc., the latter sheets superposed upon each other, and then subjected to elevated temperatures and pressures to form heat-resistant strong laminates. Alternatively, these organopolysiloxanes, advantageously dissolved in a suitable solvent, can be used to coat electrical conductors and thereafter subjected to elevated temperatures to effect conversion of the organopolysiloxanes to the substantially infusible, insoluble state. Such insulated conductors are highly resistant to elevated temperatures and to extremes of cold.

What I claim as new and desire to secure by Letters Patent of the United States is:

1. The process for oxidizing an organosilicon compound containing hydrogen attached directly to silicon wherein the organic groups of the organosilicon compound are attached to silicon by carbon-silicon linkages and are selected from the class consisting of alkyl, aryl, aralkyl, alkaryl, alkenyl, and haloaryl radicals, which process comprises contacting such compound with oxygen in the presence of a tertiary amine and a cuprous salt capable of existing as a stable cupric-amine complex soluble in the reaction medium comprising the aforesaid ingredients.

2. The process for oxidizing an organopolysiloxane containing silicon-bonded hydrogen wherein the organic groups of the organopolysiloxane are attached to silicon by carbon-silicon linkages and are selected from the class consisting of alkyl, aryl, aralkyl, alkaryl, alkenyl, and haloaryl radicals, which process comprises contacting said organopolysiloxane with oxygen in the presence of a tertiary amine and a cuprous salt capable of existing as a stable cupric-amine complex soluble in the reaction medium comprising the aforesaid ingredients.

3. The process for oxidizing a monomeric organosilane containing silicon-bonded hydrogen wherein the organic groups of the organosilane are attached to silicon by carbon-silicon linkages and are selected from the class consisting of alkyl, aryl, aralkyl, alkaryl, alkenyl, and haloaryl radicals, which process comprises contacting such monomeric silane with oxygen in the presence of a tertiary amine and a cuprous salt capable of existing as a stable cupric-amine complex soluble in the reaction medium comprising the aforesaid ingredients.

4. The process for converting phenyldimethylsilane to phenyldimethylsilanol which comprises contacting the phenyldimethylsilane with oxygen in the presence of a tertiary amine and a cuprous salt capable of existing as a stable cupric-amine complex soluble in the reaction medium comprising the aforesaid ingredients.

5. The process as in claim 4 in which the tertiary amine is N,N,N',N'-tetramethylethylenediamine and the cuprous salt is cuprous chloride.

6. The process for converting monophenylsilane to a polysiloxane composition which comprises contacting the monophenylsilane with oxygen in the presence of a tertiary amine and a cuprous salt capable of existing as a stable cupric-amine complex soluble in the reaction medium comprising the aforesaid ingredients.

7. The process as in claim 6 in which the tertiary amine is N-decyl-N,N',N'-triethylethylenediamine and the cuprous salt is cuprous chloride.

8. The process for converting tetramethyldisiloxane to a polysiloxane containing at least two

groups, which comprises contacting the tetramethyldisiloxane with oxygen in the presence of a tertiary amine and a cuprous salt capable of existing as a stable cupric-amine complex soluble in the reaction medium comprising the aforesaid ingredients.

9. The process as in claim 8 in which the tertiary amine is N,N,N',N'-tetramethylethylenediamine and the cuprous salt is cuprous chloride.

10. The process for converting a difunctional methylpolysiloxane consisting essentially of the recurring unit

to a methylpolysiloxane containing a trifunctional silicon represented by the grouping

which comprises contacting the aforesaid methyl hydrogen polysiloxane with oxygen in the presence of a tertiary amine and a cuprous salt capable of existing as a stable cupric-amine complex soluble in the reaction medium comprising the aforesaid ingredients.

11. The process as in claim 10 in which the tertiary amine is N,N,N',N'-tetra-n-amylethylenediamine thereby to yield a methylpolysiloxane having an increased functionality over the starting methyl hydrogen polysiloxane.

12. The process for converting diphenylsilane to diphenylsilanediol which comprises contacting the diphenylsilane with oxygen in the presence of a tertiary amine and a cuprous salt capable of existing as a stable cupric-amine complex soluble in the reaction medium comprising the aforesaid ingredients.

13. The process as in claim 12 in which the tertiary amine is N,N,N',N'-tetramethylethylenediamine and the cuprous salt is cuprous chloride.

14. The process for forming a benzene-soluble trifunctional methylpolysiloxane from a difunctional methyl hydrogen polysiloxane consisting essentially of the recurring unit

which comprises dissolving the aforesaid methyl hydrogen polysiloxane in an inert solvent therefor, and thereafter contacting the solution of the methyl hydrogen polysiloxane with oxygen in the presence of a tertiary amine and a cuprous salt capable of existing as a stable cupric-amine complex soluble in the reaction medium comprising the aforesaid ingredients, while maintaining the temperature of the reaction below 80° C.

References Cited in the file of this patent

FOREIGN PATENTS 16,354    Germany _____ Oct. 13, 1955

OTHER REFERENCES

Curtice et al.: "Journal Am. Chem. Soc.," vol. 79 (1957), pages 4754–9.